May 1, 1962 D. H. RING 3,032,723
HIGH SPEED MICROWAVE SWITCHING NETWORKS
Filed May 31, 1960 3 Sheets-Sheet 1
FIG. 1
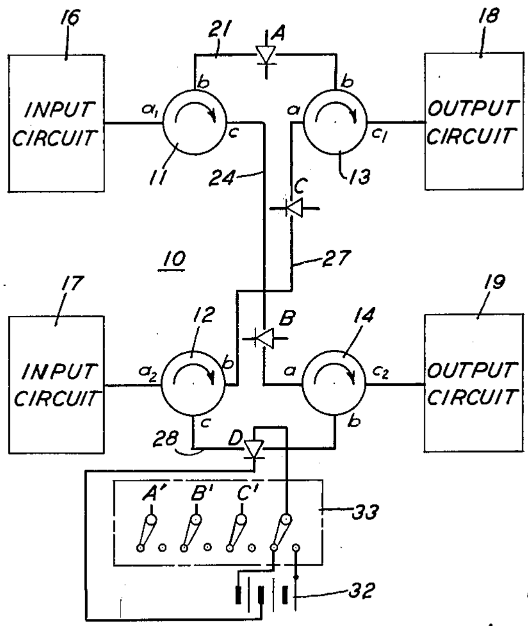
FIG. 3
FIG. 2
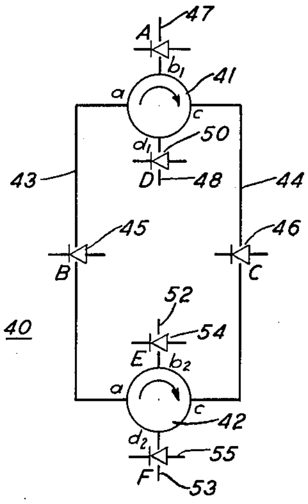
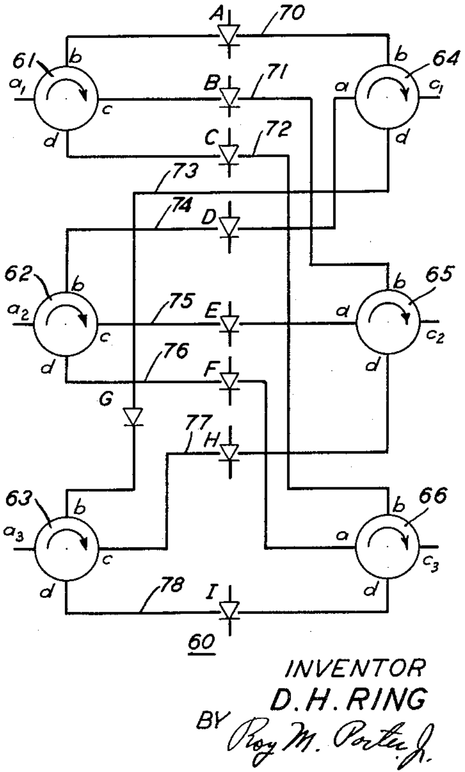
INVENTOR
D. H. RING
BY Roy M. Porter Jr.
ATTORNEY INVENTOR
D.H. RING
BY Roy M. Porter Jr.
ATTORNEY INVENTOR
D. H. RING
BY Roy M. Porter, Jr.
ATTORNEY United States Patent Office 3,032,723

Patented May 1, 1962

3,032,723

HIGH SPEED MICROWAVE SWITCHING NETWORKS

Douglas H. Ring, Red Bank, N.J., assignor to Bell Telephone Laboratories, Incorporated, New York, N.Y., a corporation of New York Filed May 31, 1960, Ser. No. 32,708
11 Claims. (Cl. 333—7)

Figure 1A:
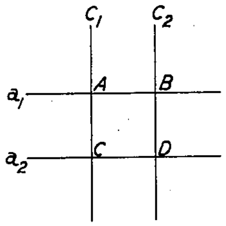

This invention relates to microwave switching networks and, more particularly, to those of the wave guide type.

In view of the ever-increasing demand for communication facilities, and the contemplated use of long distance, wide band guided wave communications systems to implement such demands, there has arisen a need for a high frequency, high speed microwave switching network.

The prior art has utilized semiconductor diodes suitably positioned and biased within wave guides, for example, as simple but extremely fast-acting microwave switches. Unfortunately, such single element switches, even if used in plural combinations, lack the flexibility and selectively dictated by a modern communication system of the cross-country guided wave type. More specifically, a microwave switching network of the wave guide type is needed and sought for use at the termination points of a multichannel guided wave system for switching any one of a plurality of $n$ radio-frequency input channels to any one of, or a combination of, $n$ radio-frequency output channels or to substitute good channels for defective channels with a minimum number of control elements.

These requirements are seen to dictate a microwave switching network which exhibits a degree of selectivity with a limited number of control elements comparable to the various well known forms of direct-current crosspoint matrices, such as utilized in digital computer circuitry, for example, but distinguishing therefrom in one important aspect by affording microwave transmission paths.

A radio-frequency switching network of the above-described type would also have particular application in microwave computer circuitry wherein many complex inerchanges of messages may be required in a time duration of the order of one millimicrosecond. In such computer circuitry, it may often be desirable to effect an interchange of messages on different inputs on a time basis. For example, in certain applications it may be desirable to utilize a switching network providing, for example, $n$ inputs, wherein each input carries radio-frequency binary information in a sequence of $n$ time slots, the information in slot one of input one being switched to slot one of output one, that in slot two of input two to slot two of output one, et cetera, whereby the outgoing channels would carry any desired combination of the information on the incoming channels on a bit-by-bit basis.

Prior art switching matrices are comprised of relatively slow speed, narrow band computer components responsive only to trains of direct-current pulses. Accordingly, such prior art switching matrices are impractical in applications wherein a network must be responsive to pulse trains having a digital pulse repetition rate of the order of 100,000,000 pulses per second, for example, which necessitates operating frequencies in the range of 10,000 megacycles. Such a pulse repetition rate can only be established by utilizing microwave energy and can only be controlled by wave propagating circuitry. Moreover, directing such extremely rapid pulses selectively from any input channel to any output channel necessitates microwave switching circuitry having a response time of the order of one millimicrosecond.

Accordingly, it is an object of this invention to provide a microwave switching network with a plurality of radio-frequency inputs that may be connected selectively to any one of a plurality of radio-frequency outputs in a time duration of the order of one millimicrosecond.

It is a more specific object of this invention to provide a microwave switching network of the wave guide type wherein any one of a plurality of $n$ radio-frequency inputs can be connected to any one of a plurality of $n$ radio-frequency outputs by altering the operating characteristics of only one control element.

These and other objects of my invention are attained in a high speed microwave switching network comprising a plurality of circulators, semiconductor diodes and wave guides arranged in combination such that any one of a plurality of radio-frequency inputs can be connected to any of a plurality of radio-frequency outputs.

In accordance with an aspect of my invention, the microwave switching networks comprise at least two banks of multibranch circulators with each output branch of the first bank connected to a different input circulator branch in the second bank, respectively, through a wave guide with a switching semiconductor diode suitably positioned and biased therein.

In accordance with another aspect of my invention in certain of the embodiments thereof, switching diodes are positioned in wave guide arms associated with each of the circulator branches not directly connected to other circulators in the network. As will become more apparent hereinafter, such an arrangement allows a reduction in the number of circulators required for a given number of input-output combinations.

In accordance with another aspect of my invention in certain embodiments thereof, the switching functions are controlled by direct-current potentials applied selectively to the diodes in the network, two states of bias making each diode either reflective or transparent to wave propagation. Advantageously, this arrangement permits radio-frequency energy to be switched from any input channel to any output channel by changing the direct-current bias of only one switching diode.

A complete understanding of this invention and of these and other features thereof may be gained from a consideration of the following detailed description taken in conjunction with the accompanying drawing, in which:

FIGS. 1 through 4 schematically illustrate microwave switching networks providing a plurality of input-output combinations embodying the principles of the instant invention; and FIGS. 1A through 4A diagrammatically illustrate the switching networks of FIGS. 1 through 4, respectively, in their equivalent form as crosspoint matrices.

Considering FIG. 1 in more detail, there is depicted in schematic form a microwave switching network 10 comprising four three-branch circulators 11, 12, 13 and 14. Corresponding branches of the four circulators are identified by the same reference letters *a*, *b* and *c*, respectively. Input circuits 16 and 17 which may comprise any form of microwave circuitry capable of generating, amplifying or propagating microwave energy, are connected through suitable wave guide sections to input branches $a_1$ and $a_2$ of circulators 11 and 12, respectively. Similarly, suitable microwave output circuits 18 and 19 are connected to output branches $c_1$ and $c_2$ of circulators 13 and 14, respectively. Output branch *b* of circulator 11 is connected to input branch $b$ of circulator 13 by a wave guide 21 having a semiconductor switching diode A suitably positioned and biased therein. The type and function of both the circulators and semiconductor diode switches will be described in greater detail hereinafter. Output branch $c$ of circulator 11 is connected to input branch $a$ of circulator 14 through a wave guide 24 which likewise has a switching diode B positioned therein. In a similar manner, the output branches $b$ and $c$ of circulator 12 are connected to input branches $a$ and $b$ of circulators 13 and 14 through wave guides 27 and 28 having suitably biased switching diodes C and D positioned therein, respectively.

Two states of biasing voltage are selectively applied to each of the switching diodes by means of a suitable voltage source and fast-acting switch, shown in FIG. 1 for purposes of illustration only as a battery 32 and a simple, four-bank, two-pole mechanical switch 33. A direct connection is shown only to switching diode D for purposes of simplicity and convenience, the other connections being indicated by the use of primed reference letters corresponding to those of the other diodes. It is to be understood, of course, that any one of a number of well known and commercial forms of logic and/or electronic switching circuitry may be employed to apply selectively the two necessary states of bias to the switching diodes of network 10, as well as to the diodes in the other networks to be described in detail hereinafter. Thus, for example, a steady-state direct-current biasing potential could be applied to all of the switching diodes so as to make them normally reflective to wave propagation, their respective transparent states being effected by trigger pulses selectively applied to the diodes by suitable transistor, vacuum tube or balanced crystal gate circuitry. It should also be understood that the switching diodes in network 10, as well as in the networks to be described in detail hereinafter, could be positioned within the wave guide branches of the circulators rather than in the sections of wave guide interconnecting the various circulators as shown. Therefore, in the following description as well as in the appended claims, when a component is described as included in a "wave guide section" connected to a branch of a circulator, it is understood that this "wave guide section" includes also the physical wave guide arms of a circulator as sold commercially. Thus, the term "branch" refers to the electrical junction within the circulator and not necessarily to the physical arm or to the flange or to other physical terminations at the end of this arm.

Before describing the operation of switching network 10, it perhaps would be advantageous to digress briefly, to discuss the functions of the component elements as well as the various forms that they may take. Circulator, as the name implies, connotes a commutation of power from one transmission mode branch to one or more others in succession, all of the power either passing through a given branch or being reflected therefrom to the next succeeding branch, none of the power introduced at the input of the circulator being absorbed therein. Such a circulator usually takes one of two basic forms, either the Faraday rotator type of circulator as disclosed in the patents of C. L. Hogan 2,748,353 and S. E. Miller 2,748,352, both issued May 29, 1956, or the rectangular wave guide, nonreciprocal phase shifter type as disclosed in M. T. Weiss Patent 2,849,685, issued August 26, 1958.

In both of these types of circulators, the electrical properties of ferrites are generally utilized to provide a multibranch nonreciprocal wave guide network wherein the electrical energy introduced at one branch thereof is coupled to only one other branch for a given direction of transmission, but to another branch for the opposite direction of transmission. For a more complete discussion of the aforementioned types of circulators as well as others, reference is made to the article entitled "Behavior and Applications of Ferrites in the Microwave Region" by A. G. Fox, S. E. Miller and M. T. Weiss, Bell System Technical Journal, volume 34, pages 5–103, January 1955.

The basic property of crystal diodes which implements its application as a high speed radio-frequency switch is the change of impedance which is effected with a change of direct-current bias applied across the diode. The impedance of the crystal diode plus its mount may be made to vary from a low inductive to a high capacitive value with an increase in direct-current bias. As a result, the impedance of the diode may be adjusted such that it either constitutes a transparent or reflective region to wave propagation when the diode is properly positioned and suitably biased within a wave guide. Such diode switching may be of either the broad band or narrow band type and utilized in filter circuits of either the band-pass, high-pass or low-pass form. For a more detailed discussion of the biasing requirements for diode switching as well as of the manner in which such diodes are positioned within a rectangular wave guide section or branch, reference is made to W. M. Goodall Patent 2,914,249, issued November 24, 1959, and, in particular, to FIG. 5, thereof.

With the operating characteristics of the circulators and switching diodes applicable for utilization in accordance with the principles of this invention well in mind, the operation of switching network 10 will now be described. Upon the introduction of radio-frequency signal energy from input circuit 16 at the input of branch $a_1$ of circulator 11, for example, the energy initially passes to the output branch $b$ in the direction as indicated by the arrow. If the bias applied to switching diode A is not altered from the value normally making the diode reflective to wave energy, the signal energy is reflected back to circulator 11 and then continues on to output branch $c$ of circulator 11. If the biasing of switching diode B is changed such that the diode is effectively transparent to wave propagation there past, the original input signal energy appears at input branch $a$ of circulator 14 and then passes therethrough in the direction of the arrow to branch $c_2$ and then to output circuit 19 for utilization. Of course if the biasing voltage applied to switching diode A had been changed such that this diode would have been transparent to the signal energy which first appeared at output branch $b$ of circulator 11, the signal energy would have then continued on through wave guide 21 to input branch $b$ of circulator 13 and ultimately appeared in output circuit 18. Network 10 therefore is seen to comprise a microwave arrangement wherein signal energy introduced at either of two inputs can be selectively directed to either of two outputs by simply changing the direct-current bias of only one switching diode. Such a switching network will be referred to hereinafter as simply a 2 x 2 network. In networks where there are more than two inputs and two outputs, they will be designated simply as $n$ x $n'$ networks where $n$ is an integer representing the number of inputs and $n'$ is an integer representing the number of outputs.

From the above description, switching network 10 is seen to provide a unique arrangement wherein the switching paths are of the microwave transmission type whereas the switching functions are advantageously controlled by two closely correlated states of direct-current bias selectively applied to each of the diodes in the network. Advantageously, the switching characteristics of the various diodes in network 10, as well as in the other embodiments, are reciprocal, i.e., their impedance characteristics make them either reflective or transparent to wave energy propagating there past in either direction through the guides.

FIG. 1A illustrates switching network 10 of FIG. 1 in its equivalent crosspoint matrix form. The diodes as well as the input and output branches in FIG. 1A are identified by the same reference numerals as used in FIG. 1. As indicated in the equivalent matrix arrangement, one switching diode is required at each effective crosspoint. With each of diodes A through D biased to be normally reflective to wave energy, there is no effective crosspoint connection between the horizontal and vertical transmission paths. If, however, the bias of one of the diodes, such as diode A, for example, is changed so that it is transparent to wave energy, then an effective crosspoint connection is made which forms a continuous path such as from the input of branch $a_1$ to the effective crosspoint defined by diode A to the output of branch $c_1$.

FIG. 2 illustrates an alternative switching network 40 which provides either two inputs and two outputs or one input and three outputs and which necessitates only two four-branch circulators 41 and 42. Input and output circuits are not shown connected to the input and output branches of network 40 nor are they shown in the networks to be described hereinafter in the interest of simplicity and convenience. Branches $a$ and $c$ of circulator 41 are connected to branches $a$ and $c$ of circulator 42 through wave guide sections 43 and 44 having switching diodes B and C positioned therein, respectively. The remaining two branches $b_1$ and $d_1$ of circulator 41 are connected to wave guide arms 47 and 48 having switching diodes A and D positioned therein, respectively. The open ends of wave guides 47 and 48 constitute either inputs or outputs of circulator 41 severally. Likewise, branches $b_2$ and $d_2$ of circulator 42 are connected to wave guide arms 52 and 53 having switching diodes E and F positioned therein, respectively, and constitute either inputs or outputs of circulator 42 severally. As in the case of switching network 10 of FIG. 1, network 40 likewise would utilize a suitable form of logic or electronic switching circuitry to apply the two requisite states of direct-current bias to the diodes in the network selectively. Such biasing and switching circuitry has not been shown in FIG. 2 in the interest of simplicity.

Figure 2A:
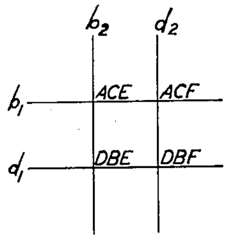

In tracing any wave propagation path through switching network 40, it is seen that the biasing of at least two and possibly three switching diodes must be changed from their normally reflective to their transparent state. For example, in directing signal energy from the input end of guide 47 to the output end of guide 48, both associated with circulator 41, both diodes A and D must be changed from their normally reflective to their transparent states by a change in bias. Alternatively, in order to switch signal energy from guide 47 to guide 52 associated with circulator 42, for example, the bias of either diodes ACE or ABE must be changed to make these groups of diodes respectively transparent to wave propagation. Signal energy could also be directed from guide 47 to the output of guide 53 associated with circulator 42 by changing switching diode F rather than E in the above-designated diode combinations from a reflective to a transparent state. As previously mentioned, the diodes in network 40 as well as in all of the other networks are reciprocal in their reflective and transparent characteristics. The equivalent crosspoint matrix of network 40 is illustrated in FIG. 2A when utilized as a 2 x 2 switching network. The same reference letters are used in FIG. 2A as in FIG. 2 to designate the corresponding input and output branches of the various circulator as well as the switching diodes associated therewith. FIG. 2A illustrates which three diodes of network 40 must be changed in bias in order to direct signal energy from the inputs of branches $b_1$ and $d_1$ to the outputs of branches $b_2$ and $d_2$ without overlapping. For example, in order to make a direct microwave connection between the input of branch $b_1$ and the output of branch $d_2$, the combination of diodes ACF must be made to appear transparent to wave energy by a suitable change in direct-current bias applied thereto. Simultaneously, radio-frequency energy could be applied at the input of branch $d_1$ and directed to the output of branch $b_2$ by making diodes DBE transparent to wave energy by a suitable change in direct-current bias applied thereto.

In following the various possible paths of energy flow through switching network 40, it is seen that while either a 2 x 2 or a 1 x 3 microwave switching network may comprise only two four-branch circulators, the minimum number of control elements or diodes that must be selectively activated at one time is two and the maximum is three. Of course, such a switching network may in certain applications offer advantages over network 10 of FIG. 1, such as when the additional diodes together with the direct-current switching circuitry associated therewith is more easily incorporated into the network than the two additional circulators as required in network 10.

Numerous modifications of switching network 40 are possible. For example, if only a 2 x 2 network rather than a combination of a 2 x 2 and a 1 x 3 network were required, switching diodes B and C could be eliminated.

FIG. 3 illustrates a microwave switching network 60 similar to network 10 of FIG. 1 but providing three inputs and three outputs, referred to hereinafter as a 3 x 3 network. Corresponding branches of the various circulators in network 60 are identified by the same reference letters. Network 60 comprises two banks of circulators, the first bank comprising three four-branch circulators 61, 62 and 63 and the second bank comprising three similar circulators 64, 65 and 66. Reference letters $a_1$ through $a_3$ designate the input branches of circulators 61 through 63, respectively, and reference letters $c_1$ through $c_3$ designate the output branches of circulators 64 through 66, respectively. As in network 10 of FIG. 1, each output branch of each circulator in the first bank is connected to an input branch of a different circulator in the second bank through wave guides with suitably positioned and biased semiconductor switching diodes positioned therein. More specifically, switching diodes A through I, together with their respectively associated wave guides 70 through 78, provide the desired microwave transmission paths between the various circulators in the first and second banks in accordance with the principles of this invention. Considering a particular sequence of switching for purposes of illustration, if microwave energy is applied at input branch $a_1$ of circulator 61 and switching diodes A through C, all being normally biased in the reflective state initially, are successively biased to be transparent to the propagation of wave energy, the input energy will then successively appear at output branches $c_1$ through $c_3$ of circulators 64 through 66, respectively.

It becomes readily apparent that signal energy applied at either of input branches $c_2$ or $c_3$ may be similarly directed to any one of the output branches $c_1$ through $c_3$, depending upon which one of diodes D through I is altered by a change in bias so as to be effectively transparent rather than reflective to the propagation of wave energy there past. It is to be understood that a suitable form of logic or electronic switching circuitry would be utilized in network 60 as in network 10 of FIG. 1 for the purpose of applying the two necessary states of direct-current bias to the diodes in the network selectively. Such biasing and switching circuitry has not been shown in FIG. 3 in the interest of simplicity.

Figure 3A:
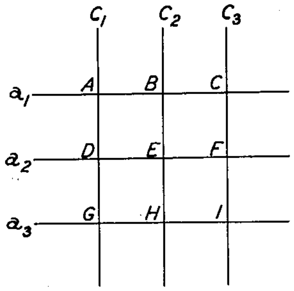

FIG. 3A diagramamtically illustrates switching network 60 in its equivalent crosspoint matrix form. Corresponding branches and diodes in FIGS. 3 and 3A are identified by like reference letters. Considering the operation of network 60 as a crosspoint matrix, if radio-frequency energy is applied to the input of branch $a_2$, for example, and the bias of switching diode E is changed such that it appears transparent to wave energy, an effective crosspoint connection will be made at the intersection of brances $a_2$ and $c_2$, thereby providing a microwave path to the output of branch $c_2$. From an examination of FIG. 3A it is readily seen that any other microwave connection may be made between any one of the horizontal transmission branches and any one of the vertical transmission branches through a change in bias of a single switching diode.

Figure 4A:
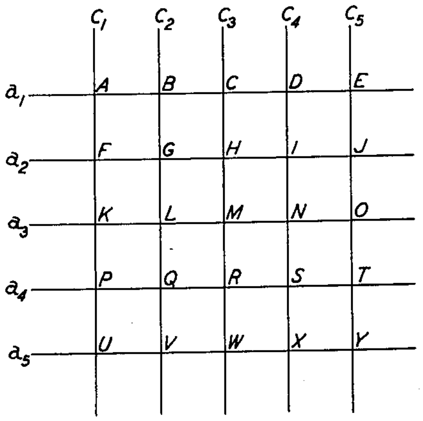
Figure 4:
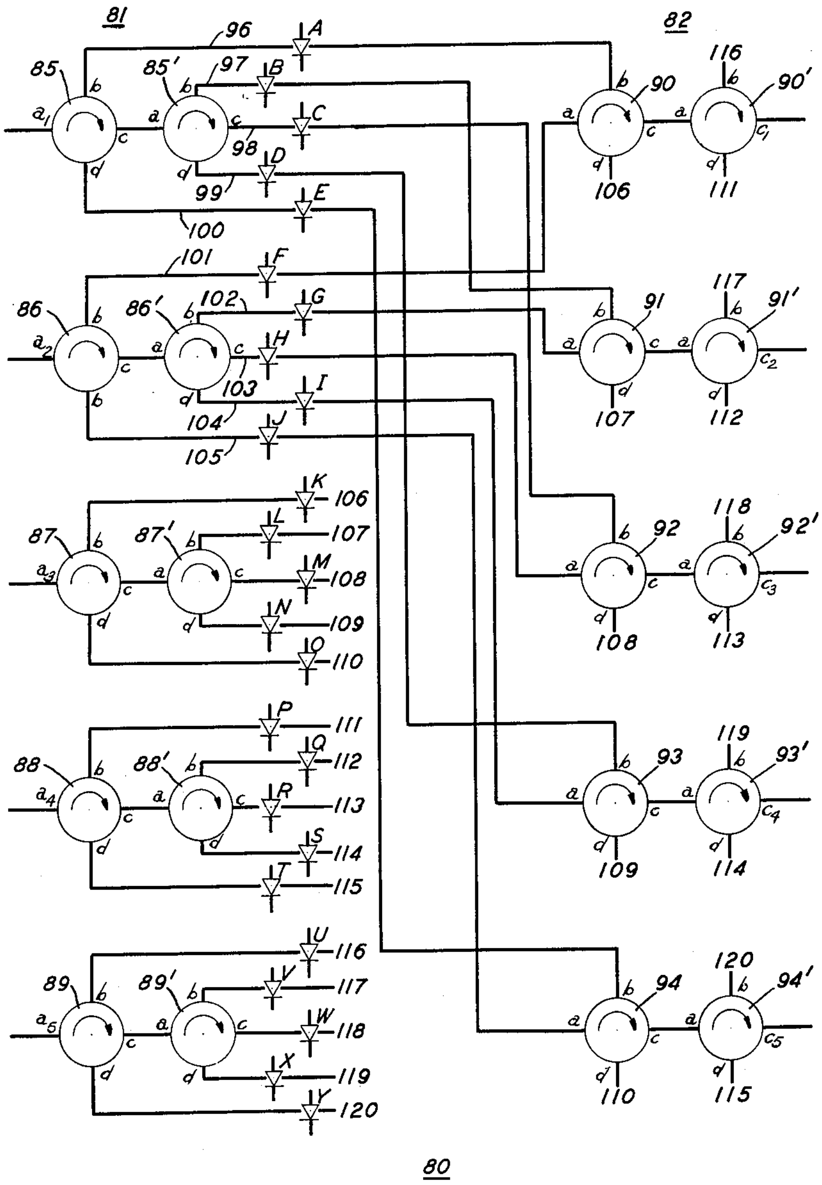

FIG. 4 schematically depicts a 5 x 5 microwave switching network 80 embodying features of this invention. As previously mentioned, commercially available circulators have a maximum number of four branches. Accordingly, a switching network utilizing single row banks of circulators and requiring a change in bias of only one switching diode for each switching operation, can, at present, be expanded to at most, a 3 x 3 network as depicted in FIG. 3. Therefore, if a switching network of the type depicted in FIG. 3 but having more than three inputs and outputs is desired, a modified arrangement of that network must be utilized. More specifically, any number of input-output switching combinations can be obtained by connecting two or more multibranch circulators in tandem in place of each circulator utilized in networks such as 10 or 60 of FIGS. 1 and 3, respectively. The tandem-connected circulators can thus be considered as one composite circulator or as a nonreciprocal multibranch network within the main switching network having any number of input and/or output branches associated therewith. For example, two four-branch circulators connected in tandem would provide six usable branches whereas three four-branch circulators connected in tandem would provide eight usable branches. In such tandem arrangements, each bank of circulators would normally comprise at least two rows of circulators with each circulator in the first row connected in tandem with a different circulator in the second row.

In FIG. 4, for example, network 80 comprises two banks of circulators 81 and 82. Bank 81 comprises five pairs of four-branch circulators 85, 85' through 89, 89' with an input arm connected to each of the input branches $a_1$ through $a_5$ of circulators 85 through 89, respectively. Similarly, bank 82 comprises five pairs of four-branch circulators 90, 90' through 94, 94 with an output arm connected to each of the output branches $c_1$ through $c_5$ of circulators 90' through 94', respectively.

In accordance with a feature of this invention, each of the five output branches of each pair of circulators in the first bank 81 is connected to an input branch of a different pair of circulators in the second bank 82, respectively, through a wave guide with a suitably positioned and biased switching diode positioned therein. For example, output branch *b* of circulator 85 is connected to input branch *b* of circulator 90 through a wave guide 96 having a switching diode A positioned therein. In the interest of simplicity, either the two-level bias source, the electronic switching circuitry for applying the bias to the diodes selectively nor the direct-current connections to the various diodes in network 80 is shown. It is understood, of course, that the two requisite states of bias applied to each of the diodes in network 80 are to make the diodes either reflective or transparent to the propagation of wave energy there past as in networks 10, 40 and 60.

Considering the other possible paths of signal energy through circulators 85, 85', assume that switching diode A is in the reflective state, input signal energy applied at branch $a_1$ then passes through circulator 85 in the direction of the arrow to branch *c*, then to branch *a* of circulator 85', whereupon it continues in the direction of the arrow to branch *b*. At branch *b* the signal energy either passes through the guide 97 with switching diode B positioned therein to the input branch *b* of circulator 91 or, if diode B is not altered from its normally reflective state, the energy then continues through circulator 85' to branch *c* thereof. At branch *c* of circulator 85' the applied signal energy either passes through guide 98 with switching diode C positioned therein to branch *b* of circulator 92 or, if diode C is not biased to be transparent to wave energy, the signal energy then continues through circulator 85' to branch *d* thereof. At this point the signal energy either passes through guide 99 with switching diode D poistioned therein to branch *b* of circulator 93 or, if diode D is not changed from its normally reflective state, the signal energy then continues through circulator 85' in the direction of the arrow and re-enters circulator 85 at branch *c* and then continues to branch *d* thereof. At branch *d* the signal energy could then be directed through guide 100 and switching diode E to the input branch *b* of circulator 94.

The signal energy upon arriving at any given one of input branches *b* of circulators 90 through 94 of bank 82, depending upon which one of diodes A through E is changed from a normally reflective to a transparent state, continues through the given circulator to branch *c* thereof, whereupon it passes to branch *a* of the second circulator connected in tandem with the given circulator and ultimately appears at the particular one of output branches $c_1$ through $c_5$ of the second circulator. More specifically, if signal energy is introduced at the input branch of $a_1$ of circulator 85 and diode A is biased to be transparent to the propagation of wave energy there past, for example, the signal energy then appears at branch *b* of circulator 90, continues to branch *c* thereof, then passes to branch *a* of circulator 90' and then continues in the direction of the arrow to the output branch $c_1$ for utilization. In a like manner, if switching diodes B through E were successively biased to be transparent to wave propagation, the signal energy, originally introduced at branch $a_1$ of circulator 85, would successively appear at output branches $c_2$ through $c_5$ of circulators 91' through 94', respectively. It is thus seen that microwave signal energy applied at input branch $a_1$ of circulator 85 of bank 81, for example, can be switched to any one of output branches $c_1$ through $c_5$ of circulators 90' through 94', respectively, depending on which one of switching diodes A through E is biased to be transparent to the propagation of wave energy there past.

In a like manner, microwave signal energy introduced at the input branch $a_2$ of circulator 86 can be made to appear at any one of output branches $c_1$ through $c_5$ of circulators 90' through 94', respectively, by selectively biasing switching diodes F through J in wave guides 101 through 105, respectively, such that the desired diode is altered from its normally reflective to a transparent state.

In the interest of simplicity, wave guide connections have not been shown between the branches of circulator pairs 87, 87', 88, 88' and 89, 89' and the necessary branches of each of the five pairs of circulators in the second bank 82. One desired arrangement for interconnecting these various branches is indicated in FIG. 3 by using corresponding reference numerals in the first and second banks to identify the pairs of branches that could be wave guide connected. By way of example, the five output branches of the pair of circulators 87, 87' of the first bank are connected through the open ended guides 106 through 110 having switching diodes K through O positioned therein to the open ended guide sections correspondingly identified which are connected to branches *d* of circulators 90 through 94 of the second bank, respectively.

Switching network 80 is thus seen to comprise an arrangement wherein microwave signal energy can be applied to any one of five inputs and, by changing the direct-current bias of only one switching diode, this energy can be directed to any one of five possible outputs in a time duration of the order of one millimicrosecond.

It is of course clear that any number of circulators may be connected in tandem in each bank to increase the number of input-output combinations. For example, if three rows of four-branch circulators were connected in a tandem arrangement similar to that depicted in FIG. 3, a 7 x 7 switching network could be constructed.

FIG. 4A diagrammatically illustrates switching network 80 in its equivalent crosspoint matrix form. The same reference letters are utilized in FIG. 4A as in FIG. 4 to identify corresponding elements and branches. As indicated in FIG. 4A, each effective crosspoint region necessitates only one switching diode to connect any one of the five inputs to any one of the five outputs. For example, radio-frequency energy introduced at the input of branch $a_2$ may be directed to the output of branch $c_2$ by simply changing the bias of switching diode E from a reflective to a transparent state. As the operating characteristics of the switching diodes within the guides in regard to their reflective and transparent states are bilateral, signal energy may be introduced to network 80 in either direction which could be of particular advantage in certain microwave systems where two-way multichannel transmission might be desired.

It is to be understood that the specific embodiments described herein are merely illustrative of the general principles of the instant invention. Numerous other structural arrangements and modifications may be devised in the light of this disclosure by those skilled in the art without departing from the spirit and scope of this invention.

What is claimed is:

1. A high speed microwave switching network comprising a plurality of multibranch circulators arranged in at least two banks, wave guide means for connecting at least two branches of one circulator in one bank to two circulator branches in another bank, a plurality of input and output circuits each connected to different ones of the remaining branches in said banks, respectively, and means for selectively directing microwave signal energy along at least two distinct paths defined between any given input and at least two output circuits, said means comprising at least one semiconductor diode with two alternate states of bias selectively applied thereto positioned within each of said distinct paths, one state of bias making the diodes reflective to wave propagation and the other state of bias making the diodes transparent to wave propagation.

2. A switching network for completing a microwave path between a plurality of input and output circuits, a plurality of circulators each having a plurality of branches, each of said input and output circuits being connected respectively to one of said branches, and means for producing selectively controllable alternate states of reflection and transmission for wave energy connected between each of the remaining branches of each circulator of a first half of said plurality and one of the remaining branches of the circulators in the remaining half of said plurality.

3. A switching network for completing a microwave path between a plurality of input and output circuits, a plurality of circulators each having a plurality of branches, each of said input and output circuits being connected respectively to one of said branches, said circulators being divided into first and second banks with wave guide means connecting each of the remaining branches of each circulator in the first bank to one of the remaining branches of the circulators in said second bank, a plurality of diodes disposed one respectively in each of said wave guide connecting means having initial biases that render said diodes reflective to wave energy, and means for applying a second bias selectively to said diodes that renders the diode so selected transmitting to said wave energy.

4. A high speed microwave switching network for connecting any one of a plurality of radio-frequency inputs to any one of a plurality of radio-frequency outputs, said network comprising at least two banks of multibranch circulators, wave guide means for connecting each output branch of each circulator in one bank to an input branch of a different circulator in said other bank, respectively, and means for making each of said wave guide means selectively transparent to wave propagation, said means comprising a semiconductor diode with two alternate states of bias applied selectively thereto in each of said wave guide means, one state of bias making the diodes reflective to wave propagation and the other state of bias making the diodes transparent to wave propagation.

5. A high speed microwave switching network for connecting any one of a plurality of radio-frequency inputs to any one of a plurality of radio-frequency outputs, said network comprising first and second banks of multibranch circulators, each of said banks comprising a plurality of circulators forming at least two distinct groups, a branch of one circulator in each of said groups in said first bank comprising an input and a branch of one circulator in each of said groups in said second bank comprising an output, wave guide means for connecting at least one circulator output branch in each of said groups in said first bank to an input branch of a circulator in a different group of said second bank, respectively, and means for making each of said wave guide means selectively transparent to wave propagation, said means comprising a semiconductor diode with two alternate states of bias selectively applied thereto in each of said wave guide means, one state of bias making the diodes reflective to wave propagation and the other state of bias making the diodes transparent to wave propagation.

6. A high speed microwave switching network in accordance with claim 5 wherein each of said groups, when comprised of a plurality of circulators, has said plurality of circulators connected in tandem by wave guide means.

7. A high speed microwave switching network comprising a plurality of multibranch circulators arranged in two banks, a plurality of input and output circuits each connected to a different circulator branch in said two banks, respectively, first wave guide means for connecting at least two remaining branches of one circulator in one bank to two different remaining circulator branches in the other bank and means for directing microwave signal energy between any given input and output circuit, said means comprising a semiconductor diode with two alternate states of bias selectively applied thereto positioned in each of the branches of said circulators in said two banks connected to said input and output circuits, one state of bias making the diodes reflective to wave propagation and the other state of bias making the diodes transparent to wave propagation.

8. A high speed microwave switching network in accordance with claim 7 wherein each of said first wave guide means has a semiconductor diode positioned therein with two alternate states of bias selectively applied thereto, one state of bias making the last-mentioned diodes reflective to wave propagation and the other state of bias making the diodes transparent to wave propagation.

9. A high speed microwave switching network in accordance with claim 7 wherein the circulators in each of said two banks are connected in pairs by wave guide means.

10. A switching network for completing a microwave path between a plurality of input and output circuits, a plurality of multibranch networks having each individual branch thereof coupled with the next preceding branch thereof for unidirective wave energy conduction from said preceding branch toward said individual branch and with the next succeeding branch thereof for unidirective electrical conduction from said individual branch toward said succeeding branch, said networks being divided into first and second banks, each of said input circuits being connected respectively to one of the branches of the networks in said first bank, each of said output circuits being connected respectively to one of the branches of the networks in said second bank, and means for producing selectively controllable alternate states of reflection and transmission for wave energy connected between each of the remaining branches of each network in said first bank and one of the remaining branches of the networks in said second bank.

11. A switching network for completing a microwave path between a plurality of input and output circuits, a plurality of multibranch networks having each individual branch thereof coupled with the next preceding branch thereof for unidirective wave energy conduction from said preceding branch toward said individual branch and with the next succeeding branch thereof for unidirective electrical conduction from said individual branch toward said succeeding branch, said networks being divided into first and second banks, each of said input circuits being connected respectively to one of the branches of the networks in said first bank, each of said output circuits being connected respectively to one of the branches of the network in said second bank, wave guide means for connecting each of the remaining branches of each network in said first bank to one of the remaining branches of the networks in said second bank, and a plurality of diodes disposed one respectively in each of said wave guide connecting means having initial biases that render said diodes reflective to wave energy, and means for applying a second bias selectively to said diodes that renders the diode so selected transparent to said wave energy.

References Cited in the file of this patent

UNITED STATES PATENTS

| | | |
|---|---|---|
| 2,848,714 | Ring | Aug. 19, 1958 |
| 2,914,249 | Goodall | Nov. 24, 1959 |